United States Patent
Chen et al.

(10) Patent No.: US 11,177,977 B2
(45) Date of Patent: Nov. 16, 2021

(54) METHOD AND SYSTEM FOR GRE TUNNEL CONTROL BASED ON CLIENT ACTIVITY DETECTION

(71) Applicant: ARRIS Enterprises LLC, Suwanee, GA (US)

(72) Inventors: Jianxiang Chen, Guangdong (CN); Jianming Liang, Guangdong (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 16/954,827

(22) PCT Filed: Dec. 21, 2017

(86) PCT No.: PCT/CN2017/117724
§ 371 (c)(1),
(2) Date: Jun. 17, 2020

(87) PCT Pub. No.: WO2019/119347
PCT Pub. Date: Jun. 27, 2019

(65) Prior Publication Data
US 2021/0091975 A1 Mar. 25, 2021

(51) Int. Cl.
*G06F 15/16* (2006.01)
*H04L 12/46* (2006.01)
(Continued)

(52) U.S. Cl.
CPC ...... *H04L 12/4633* (2013.01); *H04L 41/0806* (2013.01); *H04L 43/106* (2013.01)

(58) Field of Classification Search
USPC .......................................... 370/401; 709/200
See application file for complete search history.

(56) References Cited

U.S. PATENT DOCUMENTS 10,021,027 B2 * 7/2018 Lynn, Jr. ................ H04L 47/10
2007/0280247 A1 12/2007 Mera et al.
(Continued)

FOREIGN PATENT DOCUMENTS

| | | |
|---|---|---|
| CN | 102624746 | 8/2012 |
| EP | 3 220 584 | 9/2017 |
| WO | 2015/158122 | 10/2015 |

OTHER PUBLICATIONS

International Search Report dated Jun. 28, 2018 in International (PCT) Application No. PCT/CN2017/117724.
(Continued)

*Primary Examiner* — Anthony Mejia
(74) *Attorney, Agent, or Firm* — Wenderoth, Lind & Ponack, L.L.P.

(57) ABSTRACT

A method for control of a soft generic routing encapsulation (GRE) tunnel based on client activity includes: receiving a data packet from a first external; storing an identifier associated with the first external device in a client table and a corresponding timestamp associated with receipt of the data packet; creating a soft GRE tunnel between a local interface of the computing device and a remote gateway; updating the client table, wherein updating the client table includes adding a new identifier and corresponding timestamp associated with additional external devices upon receipt of respective data packets, and updating the timestamp corresponding to the respective identifier upon receipt of an additional packet from an additional external device; and halting a GRE health-check process associated with the soft GRE tunnel once a predetermined period of time has elapsed since the timestamp corresponding to each identifier stored in the client table.

20 Claims, 5 Drawing Sheets

(51) Int. Cl.
*H04L 12/24* (2006.01)
*H04L 12/26* (2006.01)

(56) References Cited

U.S. PATENT DOCUMENTS

| | | |
|---|---|---|
| 2012/0082073 A1 | 4/2012 | Andreasen et al. |
| 2014/0160919 A1* | 6/2014 | Kar .................. H04W 24/04 370/220 |
| 2015/0009991 A1 | 1/2015 | Sung et al. |
| 2015/0327052 A1* | 11/2015 | Ghai .................. H04W 12/06 370/328 |
| 2017/0034820 A1 | 2/2017 | Liu et al. |
| 2017/0085529 A1* | 3/2017 | Finkelstein ........... H04L 63/162 |

OTHER PUBLICATIONS

Extended European Search Report dated May 3, 2021 in European Application No. 17935517.7.
Abduallah Alshalan et al., "MobiVPN: A Mobile VPN Providing Persistency to Applications", 2016 International Conference on Computing, Networking and Communications, Feb. 15, 2016, pp. 1-6, XP032885045.

* cited by examiner

METHOD AND SYSTEM FOR GRE TUNNEL CONTROL BASED ON CLIENT ACTIVITY DETECTION

FIELD

The present disclosure relates to the control of a soft generic routing encapsulation (GRE) tunnel based on the detection of client activity, specifically the use of a client table to store timing information based on activity of client devices to determine inactivity for use in pausing the GRE monitoring process.

BACKGROUND

GRE tunnels are used to establish a direct connection between two points in a communication network, which may sometimes bridge across multiple networks. For instance, a GRE tunnel can be created between a client device in a home network and a client device in a separate home network across the Internet, or between a router and a local gateway in a single area network. GRE tunnels are beneficial for a variety of reasons, including the ability to pass data between both ends of the tunnel without restriction on data types, protocols associated therewith, or having to deal with complicated addressing of data packets.

Traditionally, GRE tunnels are created between two network devices and continue to operate until both devices disconnect. This means that the GRE tunnel will continue to be in operation regardless of whether or not data packets are received, which results in the GRE tunnel (or a device managing the tunnel, for instance) continuing to monitor for new data packets, send pings to external devices, listen for pings from external devices, etc. In some instances, client devices at one or both ends of the GRE tunnel may deactivate, enter a power-saving mode, or otherwise cease the transmission of data packets through the GRE tunnel without first properly disassociating from the tunnel endpoint or associated network. When such instances occur, the GRE tunnel will continue operation despite there being a complete lack of activity using the tunnel, due to the lack of an explicit disassociation message or event, which results in an increase in processing power and electrical power used to operate the GRE tunnel despite providing no service.

One method to solve such problems would be to have each device properly disassociate from the access point (e.g., a wireless router) or associated network prior to ceasing transmissions. However, some types of devices may not be configured to broadcast or otherwise inform the proper device of disassociation. In addition, other types of devices may be configured to disassociate, but only when certain actions are performed, which may be unknown or inconvenient to users. For example, a user may turn off their smart phone, thus ceasing transmission, without first disconnecting from a wireless hotspot, which may be required for disassociation. As a result, such as solution would require mass reconfiguration of external devices or a change in standard behavior for device users, and is thus inconvenient and impractical. Thus, there is a need for a technological solution to enable a GRE tunnel to stop its health-check process when client activity is ceased.

SUMMARY

The present disclosure provides a description of systems and methods for control of a soft GRE tunnel based on client activity. The GRE tunnel, or more specifically a device managing operation of the GRE tunnel, may create and manage a client activity table to store data regarding client activity using the GRE tunnel. The client activity table may include timing information, which may record times at which data packets are received or other activity are successfully detected of the respective client device. The computing device, such as a router, managing operation of the GRE tunnel may maintain active operation of the GRE tunnel and its health-check process until a predetermined period of time has elapsed since the last activity of a client device was detected, as indicated in the client activity table. When such a time has passed, the GRE health-check process may be ceased, and, in some cases, operation of the GRE tunnel itself halted, until such a time as a new data packet is received. The result is that the GRE tunnel health-check process may be halted if no client activity is being performed, even in cases where disassociation does not occur, thus improving computing and processing efficiency and reducing the electrical power consumed in the operation of a soft GRE tunnel.

A method for control of a soft generic routing encapsulation (GRE) tunnel based on client activity includes: receiving, by a receiver of a computing device, a data packet from a first external device via an internal network; storing, in a memory of a computing device, an identifier associated with the first external device in a client table and a corresponding timestamp associated with receipt of the data packet; creating, by the computing device, a soft GRE tunnel between a local interface of the computing device and a remote gateway; updating, by the computing device, the client table, wherein updating the client table includes adding a new identifier and corresponding timestamp associated with one or more additional external devices upon receipt of respective data packets, and updating the timestamp corresponding to the respective identifier upon receipt of an additional packet from the first or one of the one or more additional external devices; and halting, by the computing device, a GRE health-check process associated with the soft GRE tunnel once a predetermined period of time has elapsed since the timestamp corresponding to each identifier stored in the client table.

A system for control of a soft generic routing encapsulation (GRE) tunnel based on client activity includes: a receiver of a computing device configured to receive a data packet from a first external device via an internal network; and a memory of a computing device configured to store an identifier associated with the first external device in a client table and a corresponding timestamp associated with receipt of the data packet, wherein the computing device is configured to create a soft GRE tunnel between a local interface of the computing device and a remote gateway, update the client table, wherein updating the client table includes adding a new identifier and corresponding timestamp associated with one or more additional external devices upon receipt of respective data packets, and updating the timestamp corresponding to the respective identifier upon receipt of an additional packet from the first or one of the one or more additional external devices, and halt a GRE health-check process associated with the soft GRE tunnel once a predetermined period of time has elapsed since the timestamp corresponding to each identifier stored in the client table.

A non-transitory computer readable media has instructions operable to cause one or more processors to perform the operations including: receiving, by a receiver of a computing device, a data packet from a first external device via an internal network; storing, in a memory of a computing device, an identifier associated with the first external device in a client table and a corresponding timestamp associated with receipt of the data packet; creating, by the computing device, a soft GRE tunnel between a local interface of the computing device and a remote gateway; updating, by the computing device, the client table, wherein updating the client table includes adding a new identifier and corresponding timestamp associated with one or more additional external devices upon receipt of respective data packets, and updating the timestamp corresponding to the respective identifier upon receipt of an additional packet from the first or one of the one or more additional external devices; and halting, by the computing device, a GRE health-check process associated with the soft GRE tunnel once a predetermined period of time has elapsed since the timestamp corresponding to each identifier stored in the client table.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Control of a Soft GRE Tunnel

Figure 1:
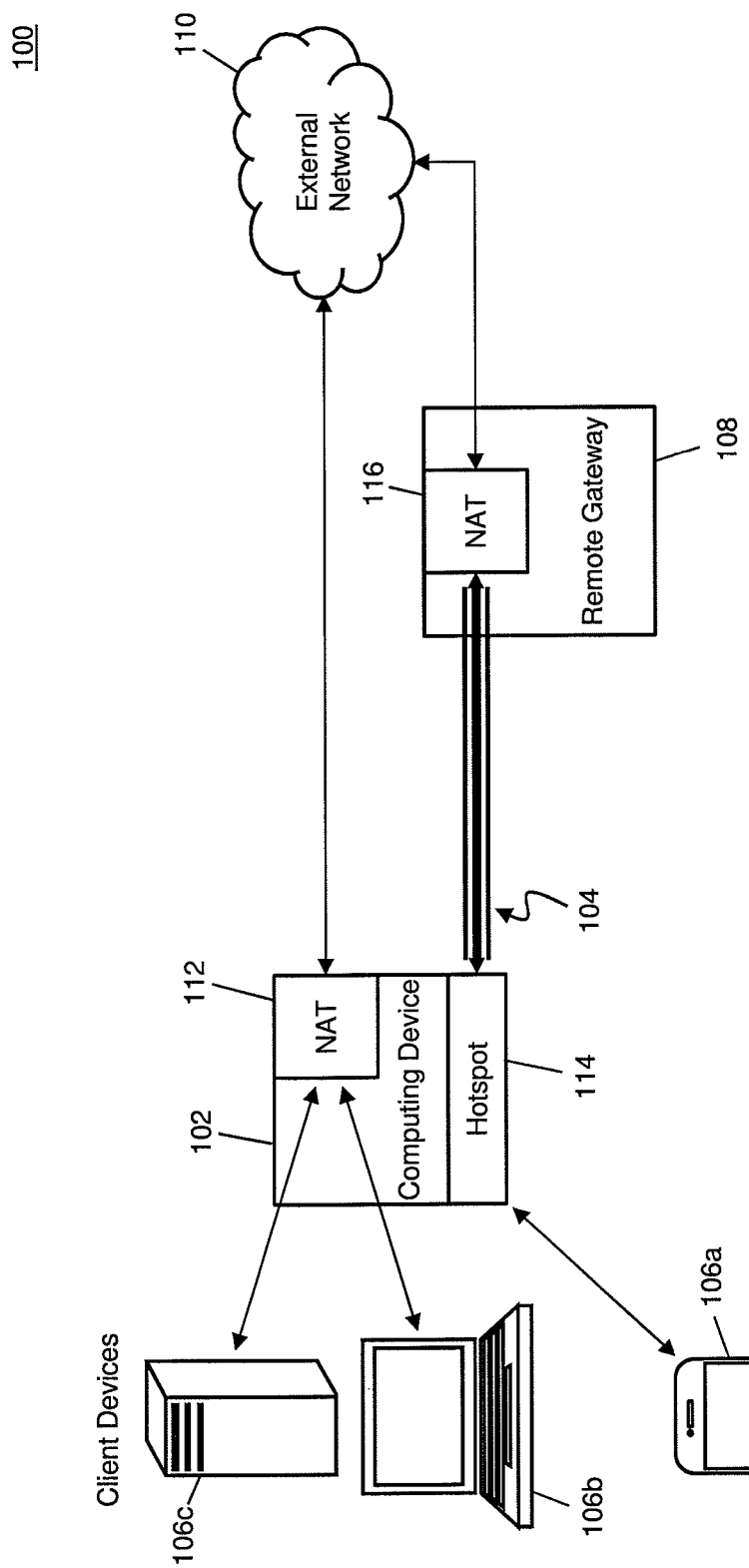
FIG. 1 is a block diagram illustrating a high level system architecture for control of a soft GRE tunnel based on client activity detection in accordance with exemplary embodiments.

FIG. 1 illustrates a system 100 for the control of a soft generic routing encapsulation (GRE) tunnel based on the detection of client activity, where a health-check process for the soft GRE tunnel may be stopped upon the ceasing of client activity without requiring disassociation of client devices.

The system 100 may include a computing device 102. The computing device 102, discussed in more detail below, may be a router or other networking device configured to operate or otherwise manage a soft GRE tunnel 104 including the operation of a GRE health-check process to monitor the receipt of data packets for transmission through the GRE tunnel and ping for activity by client devices associated therewith. In the system 100, the computing device 102 may create the soft GRE tunnel 104 for use in delivering data packets from one or more client devices 106 through the soft GRE tunnel 104 to a remote gateway 108 for further transmission, such as to a separate client device 106 or through an external network 110, such as the Internet. The client devices 106, illustrated in FIG. 1 as client devices 106a, 106b, and 106c may be any type of network-enable device that is configured to electronically transmit data packets through one or more networks, which may be able to utilize a soft GRE tunnel 104, such as a desktop computer, laptop computer, tablet computer, notebook computer, cellular phone, smart phone, smart television, smart watch, wearable computing device, other computing device 102, etc. The remote gateway 108 may be any type of device configured to receive data packets transmitted through a soft GRE tunnel 104, such as a wireless network controller, router, network switch, internet service provider system, other client device 106, etc.

In the system 100, a client device 106a may electronically transmit a data packet to be transmitted to the remote gateway 108, such as for further transmission. As part of the transmission, the client device 106 may electronically transmit the data packet to the computing device 102. The computing device 102 may receive the data packet and identify that the data packet is to be transmitted through a soft GRE tunnel 104, such as based on header data associated with the data packet or data included therein. In some instances, the soft GRE tunnel 104 may be requested for creation via an input device interfaced with the computing device 102. If the soft GRE tunnel 104 is not in operation, the computing device 102 may first create the soft GRE tunnel 104. The soft GRE tunnel 104 may be configured using configuration options sorted locally in the computing device 102 or otherwise obtained by the computing device 102, such as received from an external computing system, such as an internet service provider, router manufacturer, etc. Types of configuration options will be apparent to persons having skill in the relevant art.

The computing device 102 may create the soft GRE tunnel 104 between the computing device 102 and the remote gateway 108. Once the soft GRE tunnel 104 is created, the computing device 102 may forward the packet from the client device 106 to the remote gateway 108 via the soft GRE tunnel 104, where the remote gateway 108 may proceed to further route the data packet to an indicated address or otherwise process the data packet. The computing device 102 may then enter into a GRE health-check process, where the computing device 102 may monitor for additional activity on the soft GRE tunnel 104. Activity may include the receipt of data packets by the computing device 102 from client devices 106 or the remote gateway 108 for transmission through the soft GRE tunnel 104. In addition, the computing device 102 may be configured to electronically transmit pings, such as internet control message protocol (ICMP) pings, or other types of messages, referred to as "keep-alive messages," to the remote gateway 108 that have connected to the computing device 102 for use of the soft GRE tunnel 104 (e.g., as indicated by the receipt of a data packet therefrom).

As part of the health-check process, the computing device 102 may be configured to store and maintain a client activity table. The client activity table may be a table that stores data regarding each client device 106 that has sent a data packet through the soft GRE tunnel 104 or otherwise connected to the computing device 102 for use of the soft GRE tunnel 104. Each time a data packet is received from a new client device 106 not previously registered, a new entry is added into the client activity table for the client device 106. The entry may include at least an identifier associated with the client device 106 and a timestamp associated with the receipt of the data packet. The identifier may be any type of value unique to the client device 106 suitable for use in the identification of messages or data packets received therefrom, such as a media access control address, registration number, serial number, device identifier, etc. The timestamp may be the time at which the data packet was received. In some cases, the timestamp may be represented as a time since the last activity occurred, which, upon the receipt of a new data packet, may be zero seconds.

When new activity by a computing device 106 is detected by the computing device 102 through the GRE health-check operations, the corresponding entry in the client activity table may be updated accordingly. For instance, if a new data packet is received or the client device 106 response to an ICMP ping from the computing device 102, the computing device 102 may identify the client device's entry in the client activity table (e.g., via the identifier) and update the timestamp accordingly, such as by updating the time to the time at which the activity was received or otherwise detected or by setting the timestamp to zero seconds depending on the representation. The computing device 102 may continue to update the client activity table throughout the GRE health-check process.

The computing device 102 may continue to operate the GRE health-check process and monitor for activity associated with the soft GRE tunnel 104 until a predetermined period of time has elapsed with no activity being detected. Such a time may be based on the timestamps included in the client activity table for each entry included therein. For instance, the predetermined period of time may be 300 seconds, where the computing device 102 may determine if the timestamp for each client device 106 is at least 300 seconds earlier than a present time or if the timestamp itself is at least 300 seconds depending on the representation of the time of client activity. Once the predetermined period of time has passed for every client device 106 stored in the client entry table, then the computing device 102 may halt operation of the GRE health-check process. The computing device 102 may no longer transmit pings to the remote gateway 108 and may maintain such an operation until a new data packet is received from a client device 106 that is intended for transmission using the soft GRE tunnel 104. At such a time, the computing device 102 may re-activate the GRE health-check process and update the client activity table accordingly.

In some embodiments, the halting of the GRE health-check process may be accompanied by the closing, destruction, or other removal of the soft GRE tunnel 104. In such embodiments, the soft GRE tunnel 104 may be recreated by the computing device 102 upon the receipt of a new data packet for transmission thereby. In some such embodiments, the client activity table may also be deleted or otherwise cleared of entries upon the closing of the soft GRE tunnel 104. In these embodiments, the creation of the new soft GRE tunnel 104 may be accompanied by the addition of an entry into the client activity table for the client device 106 that sent the new data packet as the first entry into the client activity table.

In some embodiments, the predetermined period of time may be stored locally in the computing device 102. In other embodiments, the predetermined period of time may be received from an external system, such as the remote gateway 108, a router manufacturer, an internet service provider, etc. In some cases, a user of the computing device 102, such as a network technician or home owner, may set the predetermined period of time. In some embodiments, the computing device 102 may use different predetermined periods of time for different client devices 106. In some such embodiments, a different predetermined period of time may be assigned to each client device 106 individually (e.g., by identifier), by a hardware type, a connection type, operating system, or other categorization of the client devices 106. In some instances, a user of the computing device 102 may set custom groupings for the client devices 106 and the associated predetermined periods of time. In these embodiments, the GRE health-check process may be continued until the respective predetermined period of time has elapsed since the last activity for each of the client devices 106.

In some embodiments, the computing device 102 may label the client devices 106 in the client activity table based on detected activity. For instance, a client device 106 that has been active in the last minute may be labeled as "active" in the client activity table, whereas if no activity has been detected for at least one minute, the client device 106 may be labeled as "idle." In such cases, if the client device 106 has not had any activity associated therewith detected within the corresponding predetermined period of time, the client device 106 may be labeled as "disconnected." In these cases, the GRE health-check process may be halted once each client device 106 is labeled as disconnected in the client activity tablet. In cases where a client device 106 may disassociate from the computing device 102, the computing device 102 may be configured to update the labeling of the client device 106 to "disconnected" regardless of the timestamp associated with the client device 106, where the computing device 102 may consider the client device 106 as inactive accordingly. For instance, the client device 106 may electronically transmit a data message to the computing device 102 to inform the computing device 102 that it is powering down, being removed from the local network, or otherwise being disconnected from the computing device 102. In some such cases, the computing device 102 may update the timestamp in the corresponding entry in the client activity table to match the predetermined period of time to simulate its disconnected status.

The system 100 of FIG. 1 illustrates an example configuration of a system that includes the use of a soft GRE tunnel 104 to facilitate the transmission of data packets from client devices 106 to an external network 110. In the system 100, the computing device 102 may use network address translation (NAT) 112 to facilitate the transmission of data packets from client devices 106b and 106c to the external network 110, such as using traditional routing techniques and practices. The computing device 102 may also operate a hotspot 114. The hotspot 114 may be configured to receive data packets from a client device 106a, such as may be tethered or otherwise connected thereto. The computing device 102 may be configured to establish the soft GRE tunnel 104 between the hotspot and the remote gateway 108, where the remote gateway 18 may use NAT to receive data packets from the soft GRE tunnel 104 that are then forwarded on to the external network 110. In such an example, the client device 106a may be the only client device 106 with an entry in the client activity table as it may be the only client device 106 utilizing the soft GRE tunnel 104.

The methods and systems discussed herein enable a soft GRE tunnel 104 to be operated where the associated GRE health-check process may be halted when no client activity is detected. The health-check process may be halted even in cases where client devices 106 do not disassociate from the computing device 102, which may result in improved efficiency in operation over traditional soft GRE tunnel operations, in turn resulting in a decrease in necessary processing power and decrease in electrical power consumption. Thus, the methods and systems discussed herein improve in the operation of soft GRE tunnels 104 by virtue of the specialized configuration of the computing device 102 as discussed herein and in further detail below.

Computing Device

Figure 2:
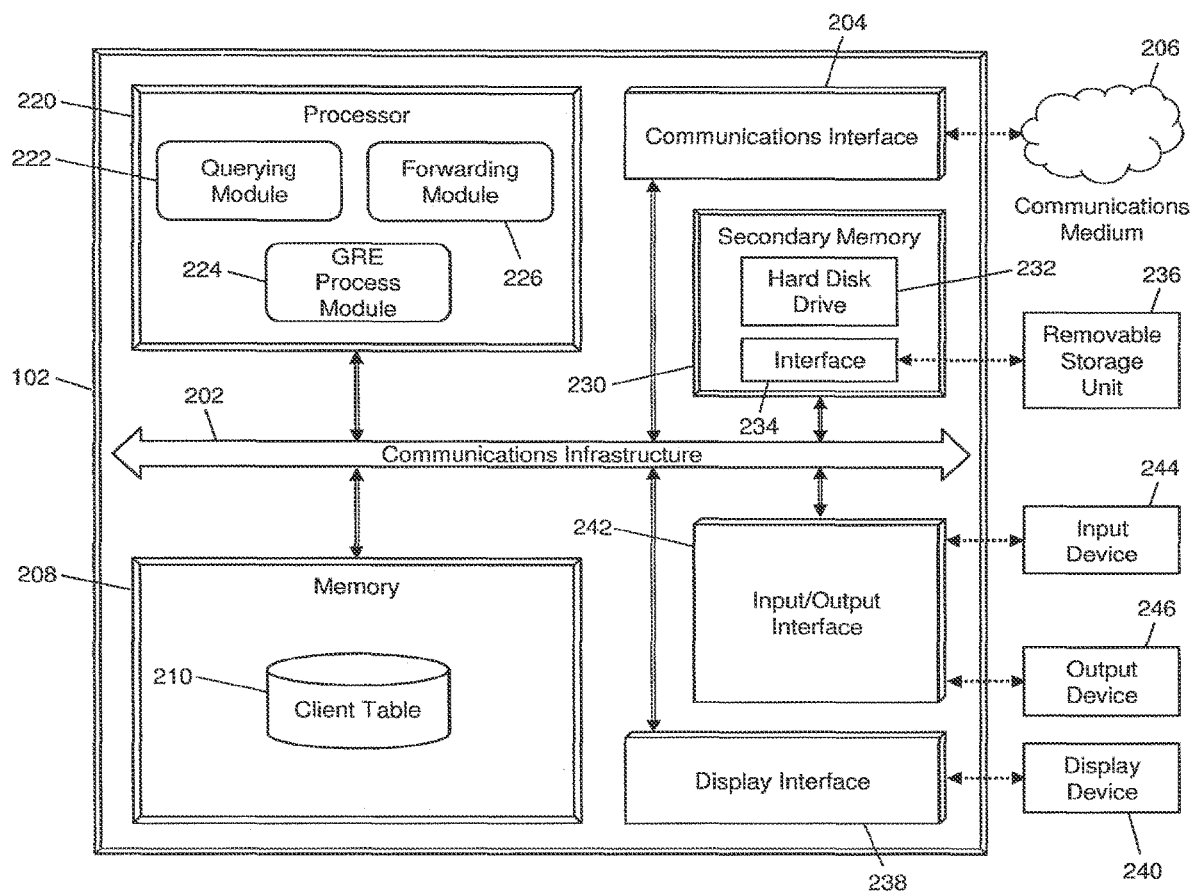
FIG. 2 is a block diagram illustrating the computing device of the system of FIG. 1 for the control of a soft GRE tunnel based on client activity detection in accordance with exemplary embodiments.

FIG. 2 illustrates an embodiment of the computing device 102 in the system 100. It will be apparent to persons having skill in the relevant art that the embodiment of the computing device 102 illustrated in FIG. 2 is provided as illustration only and may not be exhaustive to all possible configurations of the computing device 102 suitable for performing the functions as discussed herein.

The computing device 102 may include a communications infrastructure 202. The communications infrastructure 202 may be configured to transmit data between modules, engines, databases, memories, and other components of the computing device 102 for use in performing the functions discussed herein. The communications infrastructure 202 may be comprised of one or more communication types and utilize various communication methods for communications within a computing device. For example, the communications infrastructure 202 may be comprised of a bus, contact pin connectors, wires, etc. In some embodiments, the communications infrastructure 202 may also be configured to communicate between internal components of the computing device 102 and external components of the computing device 102, such as externally connected databases, display devices, input devices, etc.

The computing device 102 may also include a communications interface 204. The communications interface 204 may include one or more interfaces used to interact with and facilitate communications between the computing device 102 and one or more external devices via suitable communications mediums 206. For instance, the communications interface 204 may interface with the communications infrastructure 202 and provide an interface 204 for connecting the computing device 102 to one or more communications mediums 204 for the electronic transmission or receipt of data signals that are encoded or otherwise superimposed with data for use in performing the functions discussed herein. Communications interfaces 204 may include universal serial bus (USB) ports, Personal Computer Memory Card International Association (PCMCIA) ports, PS/2 ports, serial ports, fiber optic ports, coaxial ports, twisted-pair cable ports, wireless receivers, etc. Communications mediums 206 may include local area networks, wireless area networks, cellular communication networks, the Internet, radio frequency, Bluetooth, near field communication, etc.

In some instances, the computing device 102 may include multiple communications interfaces 204 for electronically transmitting and receiving data signals via one or more communications mediums 206, such as a first communications interface 204 configured to transmit and receive data signals via a local area network and a second communications interface 204 configured to transmit and receive data signals via the Internet. In some instances, the communications interface 204 may include a parsing module for parsing received data signals to obtain the data superimposed or otherwise encoded thereon. For example, the communications interface 204 may include (e.g., or otherwise have access to, such as via the communications infrastructure 204) a parser program configured to receive and transform the received data signal into usable input for the functions performed by the processing device to carry out the methods and systems described herein.

The communications interface 204 may be configured to receive data packets electronically transmitted by client devices 106, remote gateways 108, or other devices as may be received through internal networks, external networks 110, soft GRE tunnels 104, and other suitable sources. The communications interface 204 may also be configured to electronically transmit data packets through soft GRE tunnels 104, internal networks, external networks 110, and other communication methods. In addition, the communications interface 204 may be further configured to monitor for activity associated with a soft GRE tunnel 104, including the transmission of pings or other keep-alive messages and the receipt of data associated therewith.

The computing device 102 may also include a memory 208. The memory 208 may be configured to store data for use by the computing device 102 in perform the functions discussed herein. The memory 208 may be comprised of one or more types of memory using one or more suitable types of memory storage, such as random access memory, read-only memory, hard disk drives, solid state drives, magnetic tape storage, etc. In some cases, the memory 208 may be non-transitory computer readable media, which may be configured to store data suitable for execution by the computing device 102 in performing the functions discussed herein. The memory 208 may store data in any suitable type of configuration, such as in one or more lists, databases, tables, etc., which may store the data in a suitable data format and schema. In some instances, the memory 208 may include one or more relational databases, which may utilize structured query language for the storage, identification, modifying, updating, accessing, etc. of structured data sets stored therein.

The memory 208 of the computing device 102 may include a client table 210. The client table 210, also referred to herein as a client activity table or client status table, may be configured to store data associated with activity attributable to a client device 106 that is registered for use with a soft GRE tunnel 104. In cases where multiple soft GRE tunnels 104 may be utilized by the computing device 102, the memory 208 may include a separate client table 210 for each soft GRE tunnel 104 or may include data in each entry included in the client table 210 to which soft GRE tunnel 104 the entry corresponds. Each entry may include at least an identifier associated with the related client device 106 as well as a timestamp, which may be represented in any suitable format. In cases where a predetermined period of time may be directly associated with each client device 106, the respective data entry in the client table 210 may also include the predetermined period of time associated therewith.

The computing device 102 may also include a processor 220. The processor 220 may be configured to perform the functions of the computing device 102 discussed herein as will be apparent to persons having skill in the relevant art. In some embodiments, the processor 220 may include and/or be comprised of a plurality of engines and/or modules specially configured to perform one or more functions of the processing device, such as a querying module 222, GRE process module 224, forwarding module 226, etc. As used herein, the term "module" may be software or hardware particularly programmed to receive an input, perform one or more processes using the input, and provides an output. The input, output, and processes performed by various modules will be apparent to one skilled in the art based upon the present disclosure. The processor 220 as discussed herein may be a single processor, a plurality of processors, or combinations thereof, which may also include processors that may have one or more processor "cores." Operations performed by the processor 220 or modules included therein may be performed as a sequential process and/or be performed in parallel, concurrently, and/or in a distributed environment. In some embodiments the order of operations may be rearranged without departing from the spirit of the disclosed subject matter. The processor 220 and the modules or engines included therein may be configured to execute program code or programmable logic to perform the functions discussed herein, such as may be stored in the memory 208 and/or a secondary memory 230, discussed in more detail below.

The processor 220 of the computing device 102 may include a querying module 222. The querying module 222 may be configured to execute queries on databases to identify information. The querying module 222 may receive one or more data values or query strings, and may execute a query string based thereon on an indicated database, such as the client table 210, to identify, add, delete, update, or otherwise manage information stored therein. The querying module 222 may then output the identified information to an appropriate engine or module of the computing device 102 as necessary. The querying module 222 may, for example, execute a query on the client table 210 to insert a new data entry therein for a new client device 106 from which a data packet was received, or to update the timestamp for an existing data entry once a ping has been answered by the respective client device 106.

The processor 220 of the computing device 102 may also include a GRE process module 224. The GRE process module 224 may be configured to perform the actions of the computing device 102 associated with the creation, operation, and management of the soft GRE tunnel 104. For instance, the GRE process module 224 may be configured to create the soft GRE tunnel 104 when a first data packet is received (e.g., using configuration data stored locally in the computing device 102, such as the memory 208, or received from an external source), maintain operation of the soft GRE tunnel 104, close the soft GRE tunnel 104 if all client devices 106 are disconnected, ensure maintenance of the client table 210, etc.

The processor 220 of the computing device 102 may also include a forwarding module 226. The forwarding module 226 may be configured to route data packets received by the computing device 102 internally to the proper module, interface, engine, etc. for processing thereof. For instance, if a data packet is received from a client device 106*c*, the forwarding module 226 may forward the packet directly to the communications interface 204 for transmission to the external network 110 directly using NAT, whereas, if a data packet is received from the client device 106*a* via the hotspot 114, the forwarding module 226 may forward the data packet through the soft GRE tunnel 104. The forwarding module 226 may be configured to analyze data included in headers accompanying data packets to determine where and how data packets should be routed through the computing device 102.

In some embodiments, the computing device 102 may also include a secondary memory 230. The secondary memory 230 may be another memory in addition to the memory 208 that may be used to store additional data for use in performing the functions of the computing device 102 as discussed herein. In some embodiments, the secondary memory 230 may be a different format or may use a different data storage method and/or schema than the memory 208. The secondary memory 230 may be any suitable type of memory, and, in some instances, may include multiple types of memory. For instance, the secondary memory 230 may be comprised of a hard disk drive 232 and one or more interfaces 234, where the interfaces 234 are configured to transmit data to and receive data from one or more removable storage units 236. Removable storage units 236 may include, for example, floppy disks, compact discs, digital video discs, Blu-ray discs, removable hard drives, flash drives, universal serial bus drives, etc.

In some cases, the computing device 102 may also include a display interface 238. The display interface may be configured to interface the computing device 102 with one or more display devices 240. The display devices 240 may be devices configure to display data received from the computing device 102. Display devices 240 may be any suitable type of display, including, for example, liquid crystal displays, light emitting diode displays, thin film transistor display, capacitive touch displays, etc. In some instances, the computing device 102 may include one or more display interfaces 238, which may interface with one or more display devices 240. Display devices 240 may, for example, display menus for the selection of predetermined periods of time for client devices 106, categorization of client devices 106, etc.

The computing device 102 may also include an input/output interface 242. The input/output interface 242 may be configured to interface the computing device 102 with one or more input devices 244 and/or output devices 246 for the transmission to and receipt of data from the respective devices. The input/output interface 242 may include any suitable type of interface, and in some instances may include multiple types of interfaces, such as for interfacing with multiple types of input devices 244 and/or output devices 246. Input devices 244 may include any suitable type of device for inputting data to an computing device 102, such as a keyboard, mouse, microphone, camera, touch screen, click wheel, scroll wheel, remote control, etc. Input devices 244 may be configured to receive input from a user of the computing device 102, such as for the selection of configuration options, selection of predetermined periods of time, etc. Output devices 246 may include any suitable type of device for outputting data from the computing device 102, such as a speaker, remote control, headset, tactile feedback device, etc.

Process for Control of a Soft GRE Tunnel

Figure 3:
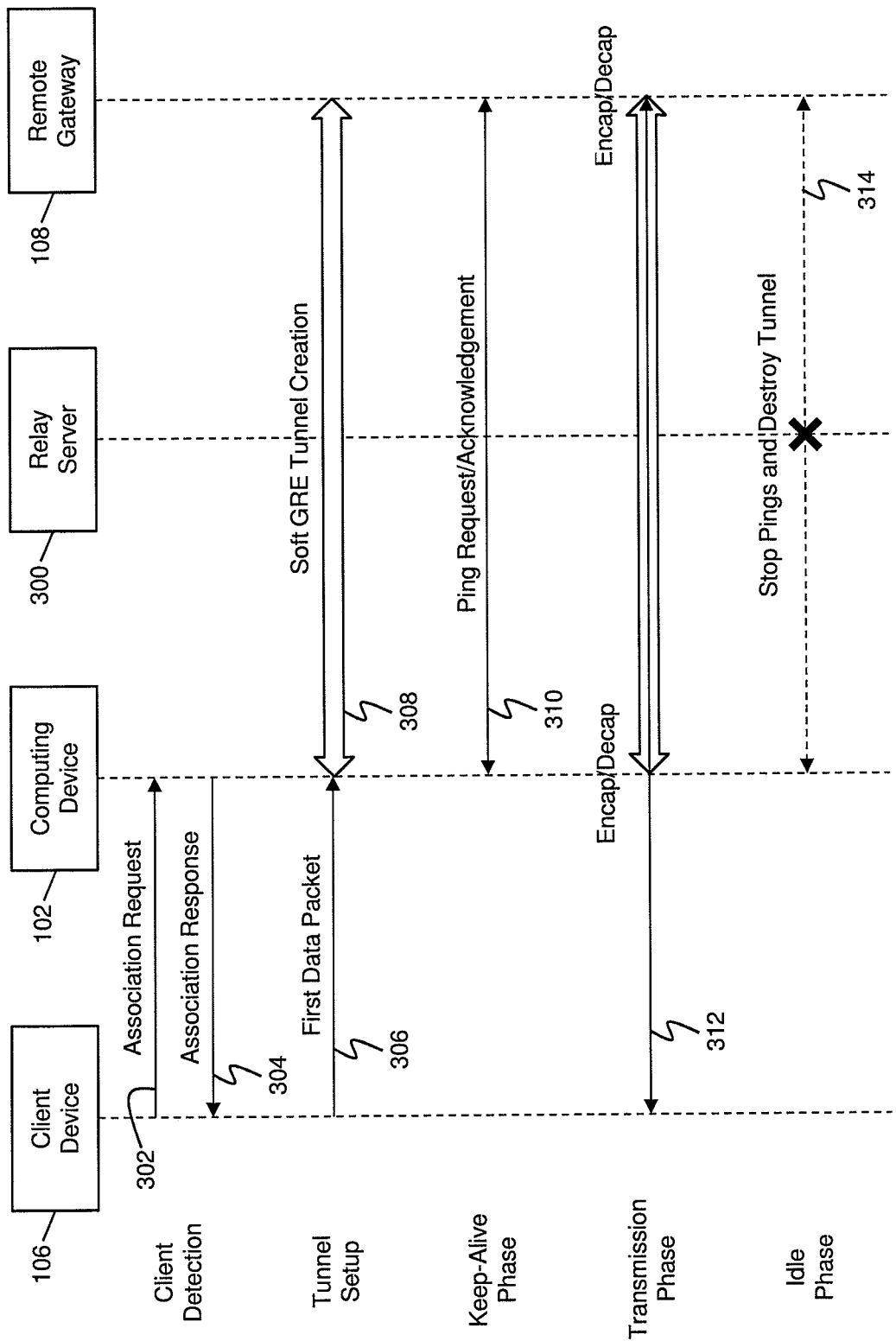
FIG. 3 is a flow diagram illustrating processes for management of a soft GRE tunnel based on client activity detection in the system of FIG. 1 in accordance with exemplary embodiments.

FIG. 3 illustrates example control of the soft GRE tunnel 104 in the system 100 illustrated in FIG. 1 based on activity of client devices 106. As illustrated in FIG. 3, the system 100 may also include a relay server 300, which may be an additional network device through which data packets may be transmitted, where the soft GRE tunnel 104 may operate to pass data packets through the relay server 300. The relay server 300 may be, for example, a cable modem termination system (CMTS) or other type of relay equipment.

As part of the detection of a new client device 106 in the system 100, in step 302, the client device 106 may electronically transmit an association request to the computing device 102. The association request may include at least an identifier associated with the client device 106, such as a media access control address, that will be included in data packets and other messages transmitted from the client device 106 for attribution thereto. In some cases, the association request may also specify the soft GRE tunnel 104 to which the client device 106 wants to be associated. The computing device 102 may receive the association request and add a new entry into the client table 210 for the client device 106 that includes the identifier and labels the client device 106 as active. In step 304, the computing device 102 may return an association response to the client device 106 indicating that the association of the client device 106 with the soft GRE tunnel 104 was successful and that the client device 106 may begin to transmit data packets for forwarding through the soft GRE tunnel 104.

As part of the tunnel setup process, in step 306, the client device 106 may electronically transmit its first data packet to the computing device 102. The data packet may include header data that includes the client device's identifier as the source address. The computing device 102 may receive the data packet and may, in step 308, create the soft GRE tunnel 104. The soft GRE tunnel 104 may be configured with configuration options that are included in configuration data stored locally in the computing device 102 or received thereby, and may be created between the computing device 102 and a remote gateway 108. In some embodiments, a relay server 300 or other network devices may be situated between the computing device 102 and the remote gateway 108 through which the soft GRE tunnel 104 operates. The computing device 102 may forward the first data packet to the remote gateway 108 via the soft GRE tunnel 104 following its creation.

As part of a keep-alive phase, in step 310 the computing device 102 and remote gateway 108 may exchange pings, such as via the ICMP. For instance, the computing device 102 may attempt to ping the remote gateway 108 and may receive acknowledgements from the remote gateway 108 in response to pings, and vice versa. The keep-alive phase may continue until such a time when the computing device 102 determines that all client activity has ceased for a predetermined period of time, as discussed herein.

As part of the transmission phase, in step 312, the client device 106 may transmit a new data packet to the computing device 102 for bridging through the soft GRE tunnel 104 to the remote gateway 108 for further delivery to an external network 110, or the remote gateway 108 may receive a data packet from the external network 110 for receipt by the client device 106 using the soft GRE tunnel 104. The computing device 102 may receive the data packet from the client device 106 using a suitable internal communication network and may forward (e.g., via the forwarding module 226) the data packet to the soft GRE tunnel 104. In other cases, the computing device 102 may receive the data packet from the remote gateway 108 using the soft GRE tunnel 104, where it may be forwarded to the client device 106. The soft GRE tunnel 104 may be configured to encapsulate data that is received at one end of the tunnel and decapsulate the data once it has been transmitted to the other end of the tunnel. For example, the soft GRE tunnel 104 may encapsulate data packets at the computing device 102 end of the tunnel when received from a client device 106 and may decapsulate the data packet once it hits the remote gateway at the other end of the tunnel.

As part of the idle phase, which may begin when the computing device 102 determines that all client devices 106 are disconnected, in step 314, the computing device 102 may halt operation of the GRE health-check process, which may include that ceasing of the exchange of pings between the computing device 102 and remote gateway 108 as endpoints of the soft GRE tunnel 104. In some embodiments, the soft GRE tunnel 104 may be destroyed or otherwise closed, where it may need to be recreated (e.g., as described in the tunnel setup, discussed above) when a new data packet is received from an activated client device 106.

Figure 4:
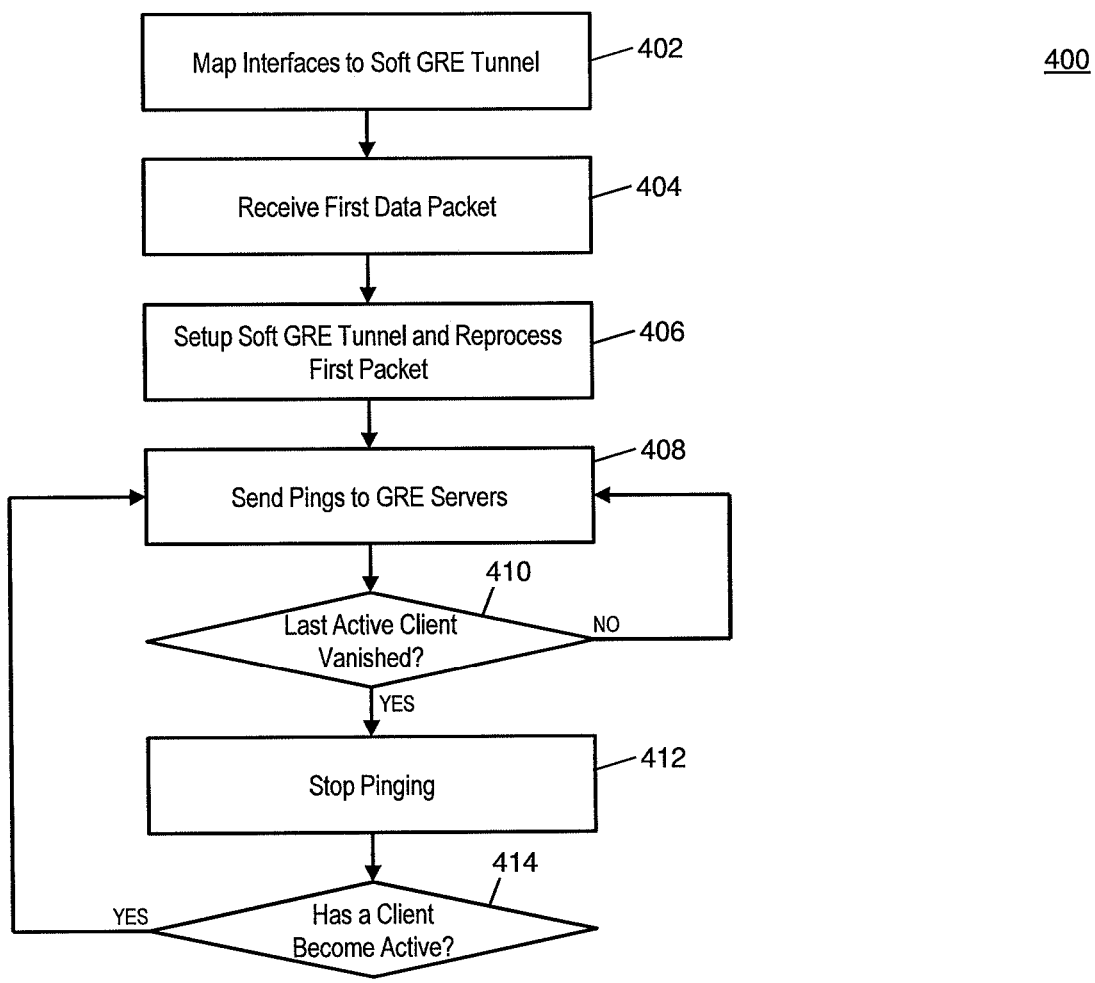
FIG. 4 is a flow diagram illustrating a process for the management of a soft GRE tunnel health-check process using the computing device of FIG. 2 in accordance with exemplary embodiments.

Process for Control of Soft GRE Health-Checking Based on Client Activity Detection FIG. 4 illustrates a method 400 for the control of a health-check process for a soft GRE tunnel 104 in the computing device 102 based on the detection of activity of client devices 106 associated with the soft GRE tunnel 104 using the client table 210.

In step 402, the GRE process module 224 of the computing device 102 may map interfaces to a soft GRE tunnel 104 that is to be created, such as by mapping the soft GRE tunnel 104 to the hotspot 114 of the computing device 102 and the NAT 116 of the remote gateway 108 in the example illustrated in FIG. 1. In step 404, a receiver of the communications interface 204 of the computing device 102 may receive a first data packet from a client device 106 at one of the mapped interfaces. The data packet may include at least a header that includes an identifier associated with the client device 106. As part of the receipt of the data packet, the GRE process module 224 may add a new data entry into the client table 210 associated with the client device 106.

In step 406, the GRE process module 224 of the computing device 102 may set up the soft GRE tunnel 104 using configuration options stored locally or received from an external source and reprocess the first data packet by forwarding (e.g., via the forwarding module 226 of the computing device 102) the first data packet to the remote gateway 108 via the soft GRE tunnel 104. In step 408, a transmitter of the communications interface 204 of the computing device 102 may transmit pings to GRE servers, such as the remote gateway 108 and hotspot 114, to detect activity by client devices 106 on either end of the soft GRE tunnel 104. In some cases, the pings may be acknowledged by the GRE servers.

In step 410, the GRE process module 224 may determine if the last active client device 106 has vanished. The determination may be based on the status of each client device 106 in the client table 210 maintained by the computing device 102 for the soft GRE tunnel. If at least one client device 106 is still active (e.g., activity has been detected within the predetermined period of time, such as indicated by an "active" or "idle" label), then the process 400 may return to step 408 where the computing device 102 may continue to ping. If each client device 106 in the client table 210 is disconnected (e.g., the predetermined period of time has elapsed since the last activity by the respective client device 106 was detected, the client device 106 has sent an explicit disconnection or leave message, etc.), then, in step 412, the GRE process module 224 may halt the GRE health-check process, which may include the halting of pings between the computing device 102 and GRE servers. In some embodiments, step 412 may include the destruction or closure of the soft GRE tunnel 104.

In step 414, the computing device 102 may determine if one of the client devices 106 has become active. The determination may be based on the detection of new client activity, such as the receipt of a new data packet from the client device 106 be one of the interfaces mapped to the soft GRE tunnel 104. Until such a time as a client device 106 becomes active, the computing device 102 may maintain its present operation. Once the computing device 102 determines that a client device 106 is active (e.g., the new data packet has been received therefrom), then the process 400 may return to an active health-check state in step 408 where the GRE health-check process continues and pings are exchanged with the GRE servers and the client table 210 updated accordingly. In embodiments where the soft GRE tunnel was closed in step 412, then, in step 414, the process 400 may return to step 406 if a disconnected client device 106 becomes active, where the soft GRE tunnel 104 may be re-set up and the received data packet reprocessed accordingly.

Exemplary Method for Control of a Soft GRE Tunnel Based on Client Activity

Figure 5:
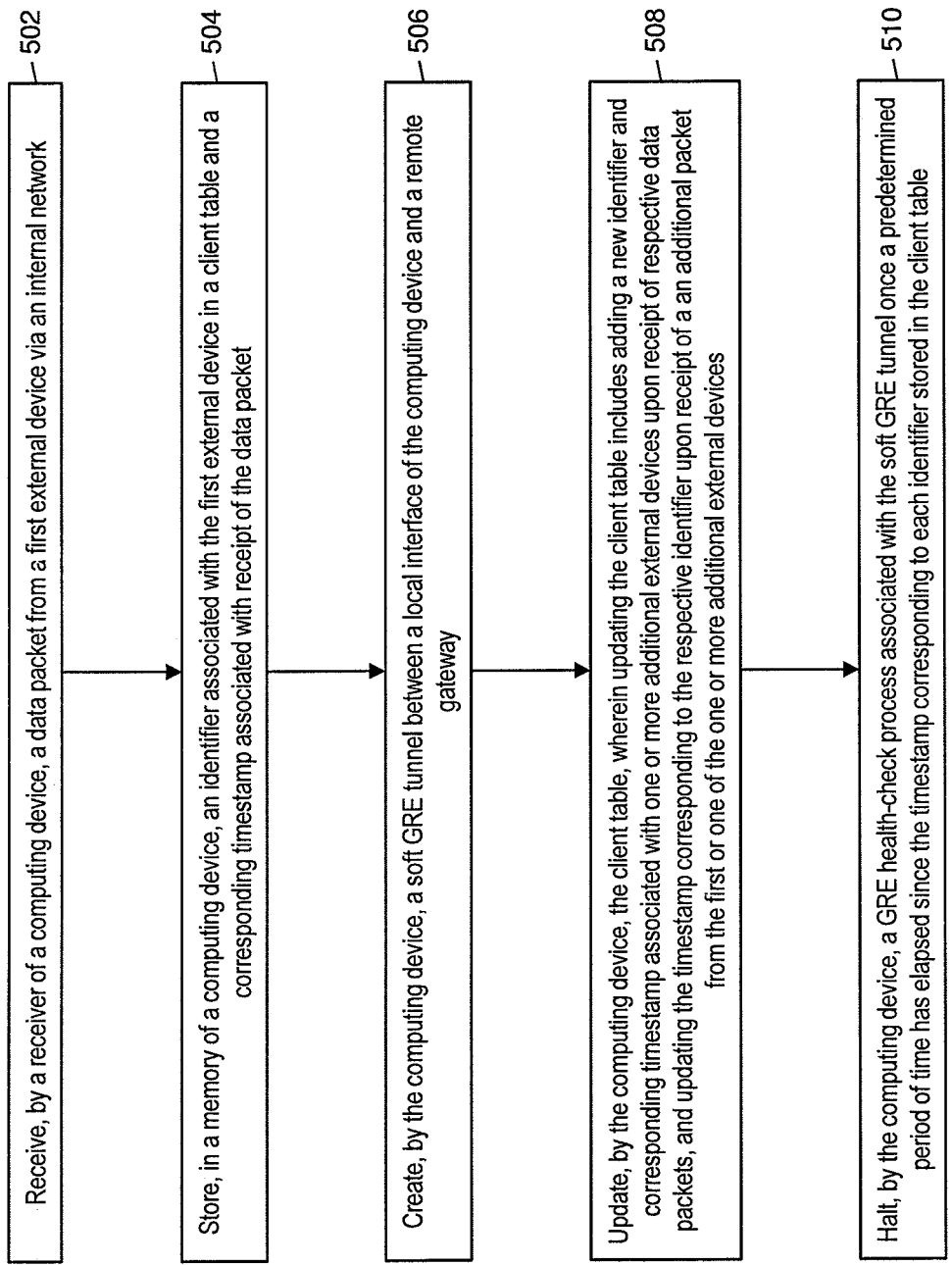
FIG. 5 is a flow chart illustrating an exemplary method for control of a soft GRE tunnel based on client activity in accordance with exemplary embodiments.

FIG. 5 illustrates a method 500 for the control of a soft generic routing encapsulation (GRE) tunnel based on client activity where a GRE health-check process may be halted based on client activity without requiring disassociation of client devices.

In step 502, a data packet may be received by a receiver of a computing device (e.g., the computing device 102) from a first external device (e.g., a client device 106) via an internal network. In step 504, an identifier associated with the first external device and a corresponding timestamp associated with receipt of the data packet may be stored in a client table (e.g., the client table 210) stored in a memory (e.g., the memory 208) of the computing device. In step 506, a soft GRE tunnel (e.g., the soft GRE tunnel 104) between a local interface (e.g., the hotspot 114) and a remote gateway (e.g., the remote gateway 108) may be created by the computing device.

In step 508, the client table may be updated by the computing device, wherein updating the client table includes adding a new identifier and corresponding timestamp associated with one or more additional external devices upon receipt of respective data packets, and updating the timestamp corresponding to the respective identifier upon receipt of an additional packet from the first or one of the one or more additional external devices. In step 510, a GRE health-check process associated with the soft GRE tunnel may be halted by the computing device once a predetermined period of time has elapsed since the timestamp corresponding to each identifier stored in the client table.

In one embodiment, the method 500 may further include forwarding, by a transmitter of the computing device, the received data packet from the first external device via the soft GRE tunnel following creation of the soft GRE tunnel. In some embodiments, the predetermined period of time may be based on a hardware type for the respective external device. In one embodiment, the predetermined period of time may be stored in the memory of the computing device.

In some embodiments, the method 500 may also include receiving, by the receiver of the computing device, configuration data from an external computing system, wherein the configuration data includes at least the predetermined period of time. In one embodiment, configuration options of the soft GRE tunnel may be based on configuration data stored in the memory of the computing device. In some embodiments, the method 500 may further include receiving, by the receiver of the computing device, configuration data from an external computing system, wherein configuration options for the soft GRE tunnel are based on the received configuration data.

Techniques consistent with the present disclosure provide, among other features, systems and methods for control of a soft GRE tunnel based on client activity. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

We claim:

1. A method for control of a soft generic routing encapsulation (GRE) tunnel based on client activity, comprising:
    receiving, by a receiver of a computing device, a data packet from a first external device via an internal network;
    storing, in a memory of a computing device, an identifier associated with the first external device in a client table and a corresponding timestamp associated with receipt of the data packet;
    creating, by the computing device, a soft GRE tunnel between a local interface of the computing device and a remote gateway;
    updating, by the computing device, the client table, wherein updating the client table includes
        adding a new identifier and corresponding timestamp associated with one or more additional external devices upon receipt of respective data packets, and
        updating the timestamp corresponding to the respective identifier upon receipt of an additional packet from the first or one of the one or more additional external devices; and
    halting, by the computing device, a GRE health-check process associated with the soft GRE tunnel once a predetermined period of time has elapsed since the timestamp corresponding to each identifier stored in the client table.

2. The method of claim 1, further comprising:
    forwarding, by a transmitter of the computing device, the received data packet from the first external device via the soft GRE tunnel following creation of the soft GRE tunnel.

3. The method of claim 1, wherein the predetermined period of time is based on a hardware type for the respective external device.

4. The method of claim 1, wherein the predetermined period of time is stored in the memory of the computing device.

5. The method of claim 1, further comprising:
    receiving, by the receiver of the computing device, configuration data from an external computing system, wherein the configuration data includes at least the predetermined period of time.

6. The method of claim 1, wherein configuration options of the soft GRE tunnel are based on configuration data stored in the memory of the computing device.

7. The method of claim 1, further comprising:
    receiving, by the receiver of the computing device, configuration data from an external computing system, wherein
    configuration options for the soft GRE tunnel are based on the received configuration data.

8. A system for control of a soft generic routing encapsulation (GRE) tunnel based on client activity, comprising:
    a receiver of a computing device configured to receive a data packet from a first external device via an internal network; and
    a memory of a computing device configured to store an identifier associated with the first external device in a client table and a corresponding timestamp associated with receipt of the data packet, wherein
    the computing device is configured to
        create a soft GRE tunnel between a local interface of the computing device and a remote gateway,
        update the client table, wherein updating the client table includes adding a new identifier and corresponding timestamp associated with one or more additional external devices upon receipt of respective data packets, and updating the timestamp corresponding to the respective identifier upon receipt of an additional packet from the first or one of the one or more additional external devices, and halt a GRE health-check process associated with the soft GRE tunnel once a predetermined period of time has elapsed since the timestamp corresponding to each identifier stored in the client table.

9. The system of claim 8, further comprising:
a transmitter of the computing device configured to forward the received data packet from the first external device via the soft GRE tunnel following creation of the soft GRE tunnel.

10. The system of claim 8, wherein the predetermined period of time is based on a hardware type for the respective external device.

11. The system of claim 8, wherein the predetermined period of time is stored in the memory of the computing device.

12. The system of claim 8, wherein the receiver of the computing device is further configured to receive configuration data from an external computing system, wherein the configuration data includes at least the predetermined period of time.

13. The system of claim 8, wherein configuration options of the soft GRE tunnel are based on configuration data stored in the memory of the computing device.

14. The system of claim 8, wherein
the receiver of the computing device is further configured to receive configuration data from an external computing system, and
configuration options for the soft GRE tunnel are based on the received configuration data.

15. A non-transitory computer readable media having instructions operable to cause one or more processors to perform the operations comprising:
receiving, by a receiver of a computing device, a data packet from a first external device via an internal network;

storing, in a memory of a computing device, an identifier associated with the first external device in a client table and a corresponding timestamp associated with receipt of the data packet;

creating, by the computing device, a soft GRE tunnel between a local interface of the computing device and a remote gateway;

updating, by the computing device, the client table, wherein updating the client table includes
adding a new identifier and corresponding timestamp associated with one or more additional external devices upon receipt of respective data packets, and
updating the timestamp corresponding to the respective identifier upon receipt of an additional packet from the first or one of the one or more additional external devices; and halting, by the computing device, a GRE health-check process associated with the soft GRE tunnel once a predetermined period of time has elapsed since the timestamp corresponding to each identifier stored in the client table.

16. The non-transitory computer readable media of claim 15, being further configured to perform the options comprising:
forwarding, by a transmitter of the computing device, the received data packet from the first external device via the soft GRE tunnel following creation of the soft GRE tunnel.

17. The non-transitory computer readable media of claim 15, wherein the predetermined period of time is based on a hardware type for the respective external device.

18. The non-transitory computer readable media of claim 15, wherein the predetermined period of time is stored in the memory of the computing device.

19. The non-transitory computer readable media of claim 15, being further configured to perform the options comprising:
receiving, by the receiver of the computing device, configuration data from an external computing system, wherein the configuration data includes at least the predetermined period of time.

20. The non-transitory computer readable media of claim 15, wherein configuration options of the soft GRE tunnel are based on configuration data stored in the memory of the computing device.

* * * * *